UNITED STATES PATENT OFFICE.

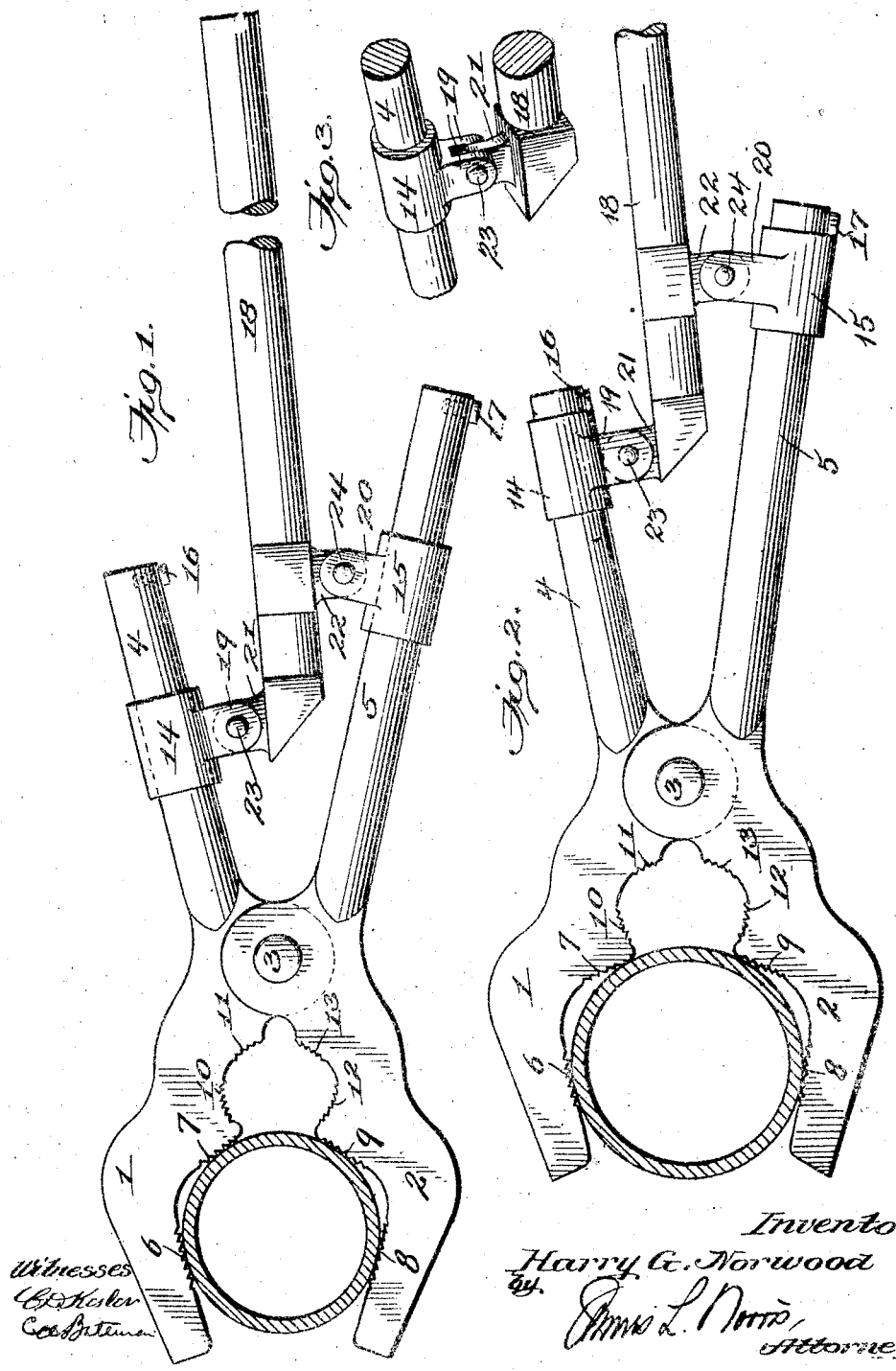

HARRY G. NORWOOD, OF STOVALL, NORTH CAROLINA, ASSIGNOR TO HOWARD W. HALL, OF RICHMOND, VIRGINIA.

PIPE-WRENCH.

1,218,576.  Specification of Letters Patent.  Patented Mar. 6, 1917.

Application filed May 6, 1916. Serial No. 95,869.

*To all whom it may concern:*

Be it known that I, HARRY G. NORWOOD, a citizen of the United States, residing at Stovall, in the county of Granville and State of North Carolina, have invented new and useful Improvements in Pipe-Wrenches, of which the following is a specification.

My present invention relates to improvements in wrenches, pliers, tongs and similar tools or implements of the class adapted for use in gripping and turning pipes and other round or substantially round objects, and the primary objects of the invention are to provide a tool or implement of this character which is relatively simple and inexpensive in construction, it being composed of but few parts which can be made cheaply; to provide a tool or implement of this class which can be readily and easily applied and removed relatively to the pipe or other object; and to provide a tool or implement of this class which is capable of obtaining a powerful leverage and in consequence a firm grip or hold upon the pipe or other object, and yet the tool is capable of being easily and quickly set or adjusted to accommodate it to pipes or other objects of different sizes or diameters.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a side elevation of a tool or implement constructed in accordance with the preferred embodiment of the invention, the same being shown adjusted for a pipe of one diameter.

Fig. 2 is a view similar to Fig. 1 showing the tool or implement applied to a pipe of a different diameter, and Fig. 3 is a detail view showing one of the adjusting slides.

Similar parts are designated by the same reference characters in the several views.

The present invention is applicable generally to tools or implements embodying coöperating relatively movable jaws adapted to grip or hold between them a pipe or other round or substantially round object. Certain features of the present invention are applicable generally to tools or implements of that class. Other features of the invention are applicable particularly to tools or implements embodying coöperative relatively movable jaws which are pivoted and have actuating levers connected thereto, the present invention providing an operating handle which acts on the jaw-actuating levers through the medium of a leverage arrangement which greatly increases the amount of force which can be applied to the jaws to close them with a given effort applied to the operating handle, the leverage arrangement being quickly and easily adjusted relatively to the jaw-actuating levers whereby the tool or implement may be set or adjusted to accommodate pipes or objects of different diameters or sizes. The preferred embodiment of the invention is shown in the accompanying drawing and will be hereinafter described in detail. It is to be understood, however, that the invention is not restricted to the particular construction shown, as equivalent constructions are contemplated and will be included within the scope of the claims.

In the present instance, the tool or implement is of a type adapted to grip pipes or other round or substantially round objects, it comprising a pair of jaws 1 and 2 which are pivotally connected by the pivot 3 and are provided with actuating levers 4 and 5 which are connected rigidly to the jaws 1 and 2, respectively. With this arrangement, approaching movement of the jaw-actuating levers 4 and 5 causes a relative separating movement of the jaw and, conversely, relative separating movement of the levers 4 and 5 causes a closing or relative approaching movement of the jaws. The jaws are provided with faces suitable to engage and obtain a suitable hold upon the pipes or other objects to be turned or manipulated. In the present instance, the jaw 1 has faces 6 and 7 to engage the object, while the jaw 2 has similar or complemental faces 8 and 9 to engage the pipe or object. The engaging faces 6 and 7 of the jaw 1 and the faces 8 and 9 of the jaw 2 are separated suitable distances in order that these engaging faces of the jaws, when the latter are closed on the pipe or object, will coöperate with the pipe or object at different points in the circumference of the pipe or object. For example, in using four engaging faces, as shown, the pipe or object will be engaged at four places spaced circumferentially thereof. This arrangement of engaging faces is advantageous, for the reason that the pressure incident to the gripping of the pipe or object by the jaws is distributed around the circumference of the pipe or object and crushing of the pipe and marring of the surface of the pipe or object are substantially avoided. This arrangement of engaging faces is particularly advantageous when the tool or implement is being used to turn or manipulate relatively thin tubing and especially when brass tubing is being manipulated. In using the tool or implement upon brass tubing, these engaging faces 6, 7, 8 and 9 may be plain or smooth. Where the tool or implement is to be used upon iron pipes or the like, these engaging faces are preferably serrated, as shown.

In order to enable the tool or implement to be used upon pipes or objects which vary considerably in diameter, a second set of engaging faces may be provided on the jaws to accommodate pipes or objects of smaller diameters or sizes than those with which the engaging faces 6, 7, 8 and 9 are used. As shown, the jaw 1 is provided with a second set of engaging faces 10 and 11, while the jaw 2 is provided with a second set of engaging faces 12 and 13, the faces 10 and 11 being preferably spaced to engage the pipe or object at different places in its circumference, while the faces 12 and 13 are also preferably spaced to engage the pipe or object at different places in its circumference. The second set of engaging faces may be conveniently located on the jaws between the set of engaging faces first mentioned and the pivot, and the engaging faces of the second set may either be plain or smooth, or they may be serrated or roughened, as shown.

The means provided by the present invention for operating the jaw-actuating levers comprises a lever arrangement which increases or multiplies the ratio of transmission of power from the handle to which the power is applied and the jaws which grip the pipe or object, and this lever arrangement is capable of being easily and quickly adjusted to accommodate the tool or implement to pipes or objects of different diameters. This lever arrangement consists, preferably, of a pair of slides 14 and 15, these slides being mounted and movable longitudinally on the actuating levers 4 and 5 of the respective jaws. Suitable stops 16 and 17 may be provided to prevent detachment of the slides relatively to the actuating levers. An operating lever or handle 18 of any suitable length is provided, and this operating lever or handle is pivotally connected to the slides 14 and 15. As shown, the slides have at their inner sides knuckles 19 and 20 which are operatively connected to knuckles 21 and 22 on the lever or handle 18 by pivot pins 23 and 24.

In using a tool or implement constructed as hereinbefore described, the jaws are fitted upon the pipe or object to be manipulated, the pipe or object being received by the appropriate set of engaging faces, depending upon the diameter or size of the pipe or object, and the operating lever or handle 18 is then moved longitudinally in a direction toward the pivot 3 connecting the jaws. Such movement of the operating lever or handle causes the slides 14 and 15 to move toward the inner ends of the jaw-actuating levers 4 and 5, and because of the divergent relation of these actuating levers, the free ends of the latter will be spread apart and the jaws will be drawn together, and hence this movement of the operating lever or handle 18 causes the jaws to close upon the pipe or object. A force applied to the operating lever or handle 18 tending to move the outer end of the same toward the actuating lever 5 will act with greatly increased leverage to spread apart the actuating levers 4 and 5, causing, in consequence thereof, a firm gripping of the pipe or object by the jaws, and when this force applied to the operating lever or handle reaches the requisite amount, the pipe or object gripped by the jaws will be turned in the direction in which the force is applied to the operating lever or handle. As shown, the tool or implement is adapted to turn the pipe or object in a clockwise direction, but where it is desirable to turn the pipe or object in an opposite direction, it is only necessary to reverse the position of the tool or implement upon the pipe or object and to apply the force to the operating handle or lever in a reverse direction. To release the tool or implement from the pipe or object, it is only necessary to reverse the direction of force applied to the operating handle or lever, that is to say, to move the free end of the lever or handle 18 toward the lever 4, the release of the tool or implement being also effected by moving the operating lever or handle longitudinally outwardly or toward the free ends of the levers 4 and 5, such movement of the operating lever or handle causing the jaws to be opened, due to the convergent relation of the actuating levers 4 and 5.

I claim as my invention:—

1. An implement of the class described comprising coöperative jaws having actuating levers, an operating handle, and means pivotally connecting said handle to said actuating levers, said means being movable longitudinally on the respective levers.

2. An implement of the class described comprising coöperative jaws and levers for actuating them, an operating lever having leverage-increasing means operatively connecting it to said actuating levers, the operating handle being adjustable bodily in a direction longitudinally of the actuating levers.

3. An implement of the class described comprising coöperating jaws having actuating levers, an operating handle, and slides pivotally connected to said handle and adjustable longitudinally on the respective actuating levers.

4. An implement of the class described comprising jaw-actuating levers arranged in angular relation to one another, slides movable longitudinally on said levers, and an operating handle pivotally connected at different points in its length to the respective slides.

5. An implement of the class described comprising pivoted jaw-actuating levers arranged in angular relation to one another, slides adjustable longitudinally of the respective levers, and an operating handle having a portion arranged between said levers and connected at different points to the respective slides, the opposite end of the handle extending beyond said levers.

In testimony whereof I have hereunto set my hand in presence of the subscribing witness.

HARRY G. NORWOOD.

Witness:
   CHAS. S. HYER.